United States Patent [19]
Dalal et al.

[11] Patent Number: 5,594,898
[45] Date of Patent: Jan. 14, 1997

[54] METHOD AND SYSTEM FOR JOINING DATABASE TABLES USING COMPACT ROW MAPPING STRUCTURES

[75] Inventors: Ketan Dalal; Matthew Bellew, both of Seattle, Wash.

[73] Assignee: Microsoft Corporation, Redmond, Wash.

[21] Appl. No.: 218,336

[22] Filed: Mar. 25, 1994

[51] Int. Cl.$^6$ .................................................. G06F 17/30
[52] U.S. Cl. ................... 395/602; 364/283.4; 364/282.1; 364/DIG. 1; 395/612
[58] Field of Search .............................................. 395/600

[56] References Cited

U.S. PATENT DOCUMENTS

| | | | |
|---|---|---|---|
| 5,043,871 | 8/1991 | Nishigaki et al. | 395/600 |
| 5,241,648 | 8/1993 | Cheung et al. | 395/600 |
| 5,247,662 | 9/1993 | Minemura et al. | 395/600 |

OTHER PUBLICATIONS

Winchell, "Fox Pro 2.0's Rushmore: here's how Fox Pro 2.0's new technology speeds queries, and when it work best" DBMS vol. 4 No. 10 Sep. 1991 pp. 54–56.

Winchell, "dBase IV 2.0 Query Innovations Borlands latest dbase Release on the forefront of bit map index optimization" –DBMS vol. 6, No. 110 Sep. 1993 p. 68(4).

"Rushmores Bald Spot", DBMS, vol. 4 No. 10 p. 58(1) Sep. 1991.

Li et al, "A New Compression Method with Fast Searching on Larger Databases" Proceedings of the 13th VLDB Conf. Brighton 1987 pp. 311–318.

*Primary Examiner*—Wayne Amsbury
*Assistant Examiner*—Jack M. Choules
*Attorney, Agent, or Firm*—Seed and Berry LLP

[57] ABSTRACT

A method and system for efficiently joining database tables using compact row mapping structures is provided. In a preferred embodiment, a one-table row mapping structure is used to join two source tables while enforcing a restriction against a column of one of the source tables. Where the restricted column value satisfies the restriction, an indication is stored in the one-table mapping structure that the source table rows listed in that row of the index satisfy the restriction. When the source tables are joined by merging indices on the join columns of the two tables, only rows of the restricted source table for which an indication is stored in the one-table row mapping structure that it satisfies the restriction are merged. In a further embodiment, an arbitrary number of source tables are joined using a series of two-table row mapping structures, each constructed to represent the joining of two adjacent tables by mapping from rows of one of the adjacent table to rows of the other adjacent table. Each two-table row mapping structure is constructed by merging indices on the join columns of the two adjacent tables. When a row of the join result table is retrieved, a row of one of the source tables is selected, and all of the two-table mapping structures are used to identify a row of each of the other source tables to which the selected row is joined.

12 Claims, 22 Drawing Sheets

| Bookmark | Employee ID | Last Name | First Name | Region |
|---|---|---|---|---|
| 1 | 503 | Davolio | Nancy | NW |
| 2 | 501 | Fuller | Andrew | NW |
| 3 | 525 | Leverling | Janice | SW |
| 4 | 510 | Peacock | Phyllis | NW |
| 5 | 566 | Buchanan | B. L. | SW |
| 6 | 521 | Suyama | Michael | SW |
| 7 | 519 | King | Jonathan | SW |
| 8 | 502 | Callahan | Linda | NW |
| 9 | 551 | Dodsworth | Annabella | SW |

Employees

FIG. 1
*Prior Art*

Orders

| Bookmark | Order ID | Order Amount | Employee ID | Last Name | First Name | Region |
|---|---|---|---|---|---|---|
| 1 | 10000 | $135.00 | 521 | Suyama | Michael | SW |
| 2 | 10001 | $1,316.95 | 502 | Callahan | Linda | NW |
| 3 | 10002 | $731.80 | 525 | Leverling | Janice | SW |
| 4 | 10003 | $498.18 | 502 | Callahan | Linda | NW |
| 5 | 10004 | $3,194.20 | 525 | Leverling | Janice | SW |
| 6 | 10005 | $173.40 | 566 | Buchanan | B.L. | SW |
| 7 | 10006 | $87.20 | 502 | Callahan | Linda | NW |
| 8 | 10007 | $1,405.00 | 510 | Peacock | Phyllis | NW |
| 9 | 10008 | $1,171.00 | 525 | Leverling | Janice | SW |
| 10 | 10009 | $1,530.00 | 502 | Callahan | Linda | NW |
| 11 | 10010 | $470.00 | 502 | Callahan | Linda | NW |
| 12 | 10011 | $589.05 | 521 | Suyama | Michael | SW |
| 13 | 10012 | $1,057.60 | 521 | Suyama | Michael | SW |
| 14 | 10013 | $560.40 | 525 | Leverling | Janice | SW |
| 15 | 10014 | $192.10 | 510 | Peacock | Phyllis | NW |
| 16 | 10015 | $1,423.50 | 521 | Suyama | Michael | SW |
| 17 | 10016 | $2,052.68 | 525 | Leverling | Janice | SW |
| 18 | 10017 | $1,148.00 | 510 | Peacock | Phyllis | NW |
| 19 | 10018 | $1,076.05 | 510 | Peacock | Phyllis | NW |
| 20 | 10019 | $87.20 | 521 | Suyama | Michael | SW |

Employees Join Orders

FIG. 3
*Prior Art*

| Bookmark | Order ID | Order Amount | Employee ID | Last Name | First Name | Region |
|---|---|---|---|---|---|---|
| 1 | 10001 | $1,316.95 | 502 | Callahan | Linda | NW |
| 2 | 10007 | $1,405.00 | 510 | Peacock | Phyllis | NW |
| 3 | 10009 | $1,530.00 | 502 | Callahan | Linda | NW |
| 4 | 10017 | $1,148.00 | 510 | Peacock | Phyllis | NW |
| 5 | 10018 | $1,076.05 | 510 | Peacock | Phyllis | NW |

Restricted Employees Join Orders

*FIG. 4*
*Prior Art*

Employees Index

Index on Employee ID Column of Orders Table

| Orders: Bookmark | Employees: Bookmark |
|---|---|
| 1 | 6 |
| 2 | 8 |
| 3 | 3 |
| 4 | 8 |
| 5 | 3 |
| 6 | 5 |
| 7 | 8 |
| 8 | 4 |
| 9 | 3 |
| 10 | 8 |
| 11 | 8 |
| 12 | 6 |
| 13 | 6 |
| 14 | 3 |
| 15 | 4 |
| 16 | 6 |
| 17 | 3 |
| 18 | 4 |
| 19 | 4 |
| 20 | 6 |

Result Table Formed by Joining
Orders Table to Employees Table

| Order Amount | Bookmark |
|---|---|
| $3,194.20 | 5 |
| $2,052.68 | 17 |
| $1,530.00 | 10 |
| $1,423.50 | 16 |
| $1,405.00 | 8 |
| $1,316.95 | 2 |
| $1,171.00 | 9 |
| $1,148.00 | 18 |
| $1,076.05 | 19 |
| $1,057.60 | 13 |
| $731.80 | 3 |
| $589.05 | 12 |
| $560.40 | 14 |
| $498.18 | 4 |
| $470.00 | 11 |
| $192.10 | 15 |
| $173.40 | 6 |
| $135.00 | 1 |
| $87.20 | 7 |
| $87.20 | 20 |

Index on Order Amount Column
of Orders Table

FIG. 12 bitmap, Orders: Order Amount >= $1,000

| mapped-from Bookmark | inclusion flag |
|---|---|
| 1 | 0 |
| 2 | 1 |
| 3 | 0 |
| 4 | 0 |
| 5 | 1 |
| 6 | 0 |
| 7 | 0 |
| 8 | 1 |
| 9 | 1 |
| 10 | 1 |
| 11 | 0 |
| 12 | 0 |
| 13 | 1 |
| 14 | 0 |
| 15 | 0 |
| 16 | 1 |
| 17 | 1 |
| 18 | 1 |
| 19 | 1 |
| 20 | 0 |

2000

| mapped-to Bookmark |
|---|
| 8 |
| 3 |
| 4 |
| 3 |
| 8 |
| 6 |
| 6 |
| 3 |
| 4 |
| 4 |

2050 two-table join result structure, Orders -> Employees mapping

FIG. 20

METHOD AND SYSTEM FOR JOINING DATABASE TABLES USING COMPACT ROW MAPPING STRUCTURES

TECHNICAL FIELD

The invention relates generally to a method and system for manipulating data stored in a database, and, more specifically, to a method and system for joining database tables using compact row mapping structures.

BACKGROUND OF THE INVENTION

A database system is a set of computer programs used by a user to store, retrieve, and manipulate data. Such data is often limited to text (letters, numerals, symbols, and other characters), but may include any data that may be stored by a computer. Most database systems store data in tables. A table is a series of rows, also called records. Each row contains data about a particular thing, such as a merchandise order. Data is typically retrieved from a table one row at a time. The rows are divided into columns. The intersection of a row and column is referred to as a field. Each column specifies a particular type of data that is contained in each field of the column. Each field contains the data of the particular type for the intersecting row and column.

FIG. 1 is a table diagram showing the contents of a sample Employees table containing data about each of several employees. The sample Employees table 100 has nine rows, each containing information about a different employee. The Employees table has columns as follows: an Employee ID column 101 uniquely identifying each employee, a Last Name column 102 containing each employee's last name, a First Name column 103 containing each employee's first name, and a Region column 104 which contains the region to which each employee is assigned. The Employee table also contains a bookmark column 110, which contains a value uniquely identifying each row in the table that can be used to quickly locate and retrieve the row. Such a value is known as a bookmark.

One way in which many databases can manipulate stored data is by joining two different tables. Joining is an operation in which a database generates a result table containing rows that are each a combination of a row from each of two existing tables. The existing tables that are joined are called source tables. A row of one source table is typically combined with a row the other source table if the rows have matching values in a join column that is part of each source table.

The combined rows of the source tattles form the result table. The result table formed by the join operation can be either an actual table containing the data from each of the joined rows of the source tables or a virtual table whose rows are generated by reading from the source tables on demand to satisfy query requests directed to the result table.

As an example, the Employees table described above may be joined to an Orders table, in which each row represents one sales order taken by one of the employees listed in the Employees table. FIG. 2 is a table diagram showing the contents of the Orders table. The Orders table 200 contains the following columns: an Order ID column 201 uniquely identifying each order, an Employee ID column 202 identifying the employee who took each order, and an Order Amount column 203 containing the dollar amount of each order. A bookmark column 210 is also shown that contains a bookmark for each row. Because both the Employees table and the Orders table contain an Employee ID column, the Employee ID column of each table can be used to join the two tables. The join produces a result table, each row of which corresponds to a row of the Orders table whose Employee ID field contents matches those of the Employee ID field of some row of the Employees table. This result table can be used to determine the name of the employee who took each order.

FIG. 3 is a table diagram showing the contents of the result table formed by joining the Employees table with the Orders table. The EmployeesJoinOrders table 300 contains the following columns: an Order ID column 301 and an Order Amount column 302 correspond to the Order ID column 201 and the Order Amount column 203, respectively, of the Orders table; an Employee ID column 303 corresponds to both the Employee ID column 202 of the Orders table and the Employee ID column 101 of the Employees table; and a Last Name column 304, a First Name column 305, and a Region column 306 correspond to the Last Name column 102, a First Name column 103, and a Region column 104, respectively, of the Employees table. A bookmark column 310 is also shown that contains a bookmark for each row. It can be readily seen that row I of the EmployeesJoinOrders table has been joined from row 1 of the Orders table (as the Order ID field of each contains "10000") and row 6 of the Employees table (as the Employee ID field of each contains "6").

Existing techniques for joining two or more tables have significant shortcomings. These include consuming inordinate levels of file retrieval resources and the inability to accommodate restrictions on the rows that are joined for each source table, as described below.

Two different joining techniques are commonly used to join two tables as described above. A first joining technique involves, for each row of the first source table, reading the row, extracting the join field from the read row, and searching the entire second source table for rows whose join field matches the join field extracted from the read row of the first source table. The first technique has the disadvantage that it proceeds very slowly, because it requires intensive data retrieval from the source tables. Because database systems are commonly compared on the basis of the speed with which they perform typical operations, the slowness of the first technique is a significant disadvantage.

Though the first joining technique is very slow, it is flexible: because it reads every row of both source tables, it can easily be adapted to apply restrictions during the join operation. A restriction is a condition based on the columns of at least one of the source tables that must be true in order for a row of the source table to be included in the join. As an example, a join between the Employees table and the Orders table could be restricted by requiring that rows from the Employees table have "NW" in the Region field and that rows from the Orders table have an amount in the Order Amount field greater than "$1,000.00". In this way, the result table is restricted to orders greater than "$1,000.00" taken by employees in the "NW" region.

FIG. 4 is a table diagram showing the contents of the result table formed by joining the Employees table with the Orders table with restrictions on the Region field and the Order Amount field. The result table 400 has the same columns as the result table 300 shown in FIG. 3. The result table 400 has fewer rows than the result table 300, since every row of the result table 300 in which the Region field does not contain "NW" or the Order Amount is not greater than "$1,000.00" has been excluded by the restriction.

A second joining technique involves maintaining indices on the columns of each table that may at some point be used as join columns. An index on a column is a mapping from the values appearing in the column to the bookmarks for the rows in which that value appears in the column. In the example discussed above, this technique would maintain indices on the Employee ID column of both the Employees table and the Orders Table. The second joining technique joins two tables by merging their indices. That is, each row in the result table corresponds to one possible combination of the bookmarks in rows of the index on the first table having a particular Employee ID field value with bookmarks in rows of the index on the second table having the same Employee ID value. This is accomplished by reading each row of the index on the first table, and seeking into the rows of the index on the second table having the same Employee ID value. A new row is formed in the result table for each combination of the bookmark in the current row of the first index and the bookmarks in the sought-into rows of the second index. Data may then be retrieved from the result table by dereferencing each of the bookmarks stored for that row of the result table.

Indices on the Employee ID column of both the Employees table and the Orders Table are shown in FIGS. 5 and 6 respectively. FIG. 5 is an index diagram of an index on the Employee ID column of the Employees table. The Employees index 500 maps from each unique value of the Employee ID column of the Employees table (shown as "Employees:EmployeeID") to the bookmark for each row of the Employees table that contains that value in its Employee ID field (shown as "Employees:Bookmark"). For example, the appearance of the bookmark "1" in the same row of the Employees index as the Employee ID "503" indicates that row 1 of the Employees table has a "503" in the Employee ID field.

FIG. 6 is an index diagram of an index on the Employee ID column of the Orders table. The Orders index 600 likewise maps from each unique value of the Employee ID column (shown as "Orders:EmployeeID") to the bookmark for each row of the Orders table that contains that value in its Employee ID field (shown as "Orders:Bookmark"). For example, the absence of a row of the Orders index 600 having a "503" in the Employee ID field indicates that no rows of the Orders table has a "503" in the Employee ID field. The appearance of the bookmarks "3", "5", "9", "14", and "17" in rows of the Orders index having a "525" in the Employee ID fields indicates that rows 3, 5, 9, 14, and 17 of the Orders table have a "525" in the Employee ID field. The second joining technique merges the Employees index with the Orders index by looping through the rows of the Employees index, and for each row, locating the row of the Orders Index that has the same Employee ID value as the current row of the Employees Index. The technique then forms a row of the result table for each combination of a bookmark listed in the current row of the Employees index and a bookmark listed in the current row of the Orders index.

FIG. 7 is a table diagram showing the result table from the above-described join operation. Each row of the result table 700 corresponds to a row of each of the source tables that has been joined. Each row therefore contains the bookmark for a row of the Orders table (shown as "Orders:Bookmark") and the bookmark for the row of the Employees table to which that row of the Orders table has been joined (shown as "Employees:Bookmark). For example, the appearance of the Orders:Bookmark "1" and the Employees:Bookmark "6" in the same row of the result table indicates that the join operation joined row 1 of the Orders table with row 6 of the Employees table. The bookmarks contained in any row of the "bookmark-only" result table shown can be used to retrieve the contents of the rows of the source tables referenced by the bookmarks.

Because the second joining technique reads only indices, which are much shorter than data tables, and because indices are optimized for searching, the second joining technique is much faster than the first joining technique, which requires reading and searching data tables that are much longer and that are not search-optimized. However, because the second joining technique does not read data tables, it is unable to apply restrictions on the contents of any column besides the join column. This failure to support restrictions constitutes a serious disadvantage.

A combination of the first joining technique and the second joining technique has been used to join multiple tables. At example of joining multiple tables is joining the Employees table to the Orders table using the Employee ID column of both tables, then the Orders table to an Order Details table using the Order ID column of both tables, then the Order De ails table to a Products table using a Product ID column of both tables. FIG. 8 is a join diagram demonstrating the combination joining technique or multiple tables. It shows the Employees table 810 having an Employee ID column, the Orders table 820 having an Employee ID column and an Order ID column, the Order Details table 830 having an Order ID column and an Product ID column, and the Products table 840 having a Product ID column. The diagram further shows three indices: an index 850 on the Employee ID column of the Employees table, an index 860 on the Order ID column of the Order Details table, and an index 870 on the Product ID column of the Products table. Applying the combined technique to complete this multiple join involves selecting to begin the join with the Orders table. According to the technique, the rows of the Orders table are traversed in order. For each row of the Orders table, indices on the join rows of the immediately adjacent tables, in this case the Employee ID column of the Employees table and the Order ID column of the Order Details table, are used to join the current row of the Orders table 821 to matching rows of the adjacent tables. First, the row of the index on the Employees table that contains the same Employee ID as the current row of the Orders table is located. This row of the index, 851, contains a bookmark for a row of the Employees table that has the same Employee ID as the current row of the Orders table, and to which the current row of the Orders table should be joined. Similarly, the row of the index on the Order Details table that contains the same Order ID as the current row of the Orders table is located. This row of the index, 861, contains a bookmark for a row of the Order Details table that has the same Order ID as the current row of the Orders table, and to which the current row of the Orders table should be joined.

At this point, the current row of the Orders table has been joined to appropriate rows of each of two of the other source tables (the Employees table and the Order Details table), but to a row of the fourth source table, i.e., the Products table. In order to join the Products table, each bookmark in row 861 of the Order Details index must be used to retrieve the corresponding row of the Order Details table. This requires the database system to read rows of the Order Details table in an arbitrary order, a very expensive operation when performed on the order of once for each row of the longest source table. The Product ID field is then extracted from every retrieved row of the Order Details table, e.g., row 831 of the Order Details table, and the row of the index on the Products table that contains the same Product ID as that row of the Order Details table is located. This row of the index, 871, contains a bookmark for a row of the Products table that has the same Product ID as the current row of the Order Details table, and to which the current row of the Order Details table should be joined. In the above-described example, the technique completes this iteration of the join by joining the current row of the Ordered Details table to the row of the Products table referenced by the bookmark contained by this row of the index, and then traversing to the next row of the Orders table to identify another set of rows from the source tables to be joined.

Because this technique requires the expensive operation of reading the data table in arbitrary order for any source tables after the first three that it joins (e.g., the Order Details table), it is inefficient for joining more than three source tables. It, like the second technique for joining two tables discussed above, is further hampered by the fact that, where the technique reads an index on a source table instead of the table itself, it is unable to apply any restrictions to the rows of the table joined.

SUMMARY OF THE INVENTION

It is an object of the invention to provide a method and system in a computer system for rapidly joining the rows of a first source table whose restriction fields satisfy a restriction condition with the rows of a second source table.

It is another object of the invention to provide a method and system in a computer system for efficiently filtering the rows of a source table to exclude those having a restricted field value that does not satisfy a restriction condition.

It is a further object of the invention to provide a method and system in a computer system for applying a multi-table restriction to a result table formed by joining two or more source tables.

It is a yet further object of the invention to provide a method and system in a computer system for efficiently joining matching rows of an arbitrary number of source tables.

These and other objects, which will become apparent as the invention is more fully described below, are provided by a method and system for joining database tables using compact row mapping structures. In a preferred embodiment, a one-table row mapping structure is used to join two source tables while enforcing a restriction against a column of one of the source tables, contains an indication of whether each row of the restricted source table satisfies the restriction, and is constructed by traversing an index on the restricted column and evaluating the restriction against the restricted column value for each row of the index. Where the restricted column value satisfies the restriction, an indication is stored in the one-table mapping structure that the source table rows listed in that row of the index satisfy the restriction. When the source tables are joined by merging indices on the join columns of the two tables, only rows of the restricted source table for which an indication is stored in the one-table row mapping structure that it satisfies the restriction are merged. In a further embodiment, multiple disjunctive single-table row mapping structures are applied after two source tables are joined in order to enforce a multiple-table disjunctive restriction in conjunction with the join operation. In a still further embodiment, an arbitrary number of source tables are joined using a series of two-table row mapping structures, each constructed to represent the joining of two adjacent tables by mapping from rows of one of the adjacent table to rows of the other adjacent table. Each two-table row mapping structure is constructed by merging indices on the join columns of the two adjacent tables. When a row of the join result table is retrieved, a row of one of the source tables is selected, and all of the two-table mapping structures are used to identify a row of each of the other source tables to which the selected row is joined.

BRIEF DESCRIPTION OF THE DRAWINGS

FIG. 1 is a table diagram showing the contents of a sample Employees table containing data about each of several employees.

FIG. 3 is a table diagram showing the contents of the result table formed by joining the Employees table with the Orders table.

FIG. 4 is a table diagram showing the contents of the result table formed by joining the Employees table with the Orders table with restrictions on the Region field and the Order Amount field.

FIG. 7 is a table diagram showing the result table from the above-described join operation.

FIG. 12 is an index diagram showing the contents of the index on the Order Amount Column of the Orders table.

FIG. 20 is a diagram showing he two-table row mapping structure constructed for mapping from the Employees table to the Orders table.

DETAILED DESCRIPTION OF THE INVENTION

Figure 2:
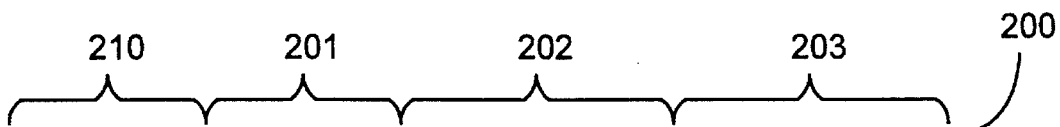
FIG. 2 is a table diagram showing the contents of the Orders table.
Figure 5:
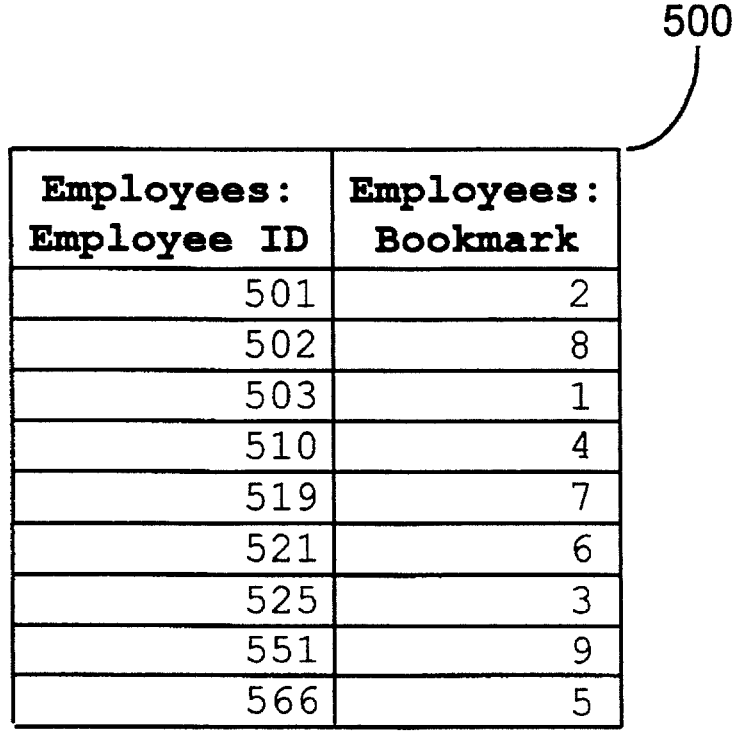
FIG. 5 is an index diagram of an index on the Employee ID column of the Employees table.
Figure 6:
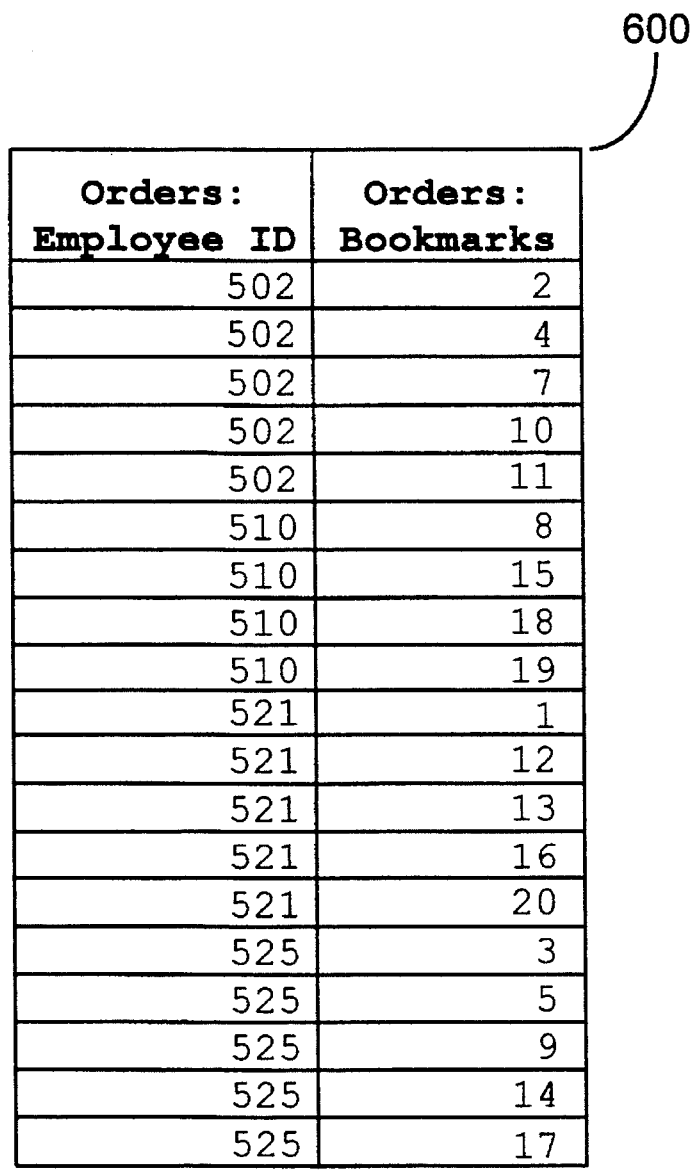
FIG. 6 is an index diagram of an index on the Employee ID column of the Orders table.
Figure 8:
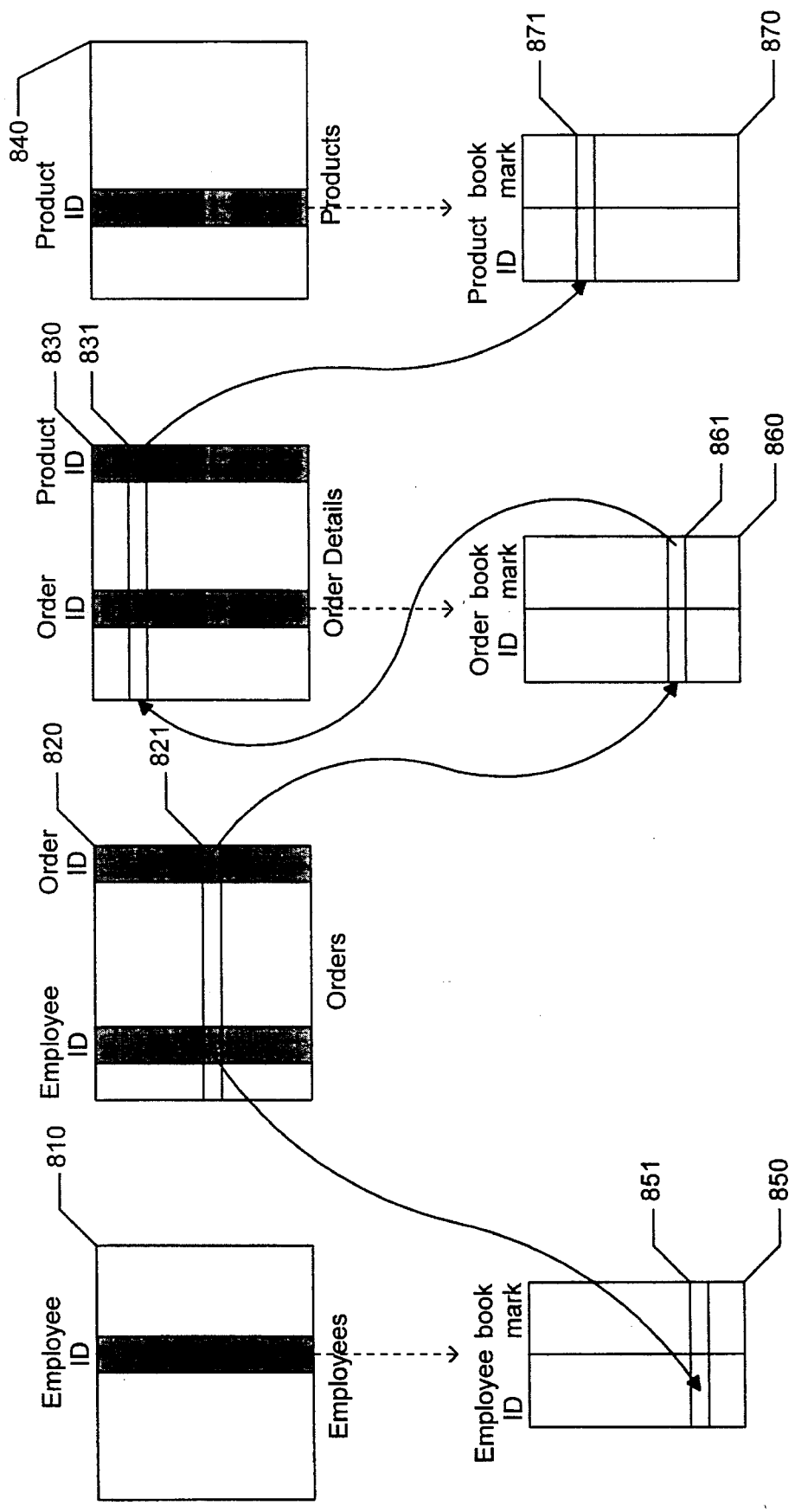
FIG. 8 is a join diagram demonstrating the combination joining technique for multiple tables.

A method and system for joining database tables using compact row mapping structures is provided. In a preferred embodiment, a software facility for joining tables (the facility) is provided as part of a database system. The facility uses what are referred to as "one-table row mapping structures" to efficiently join database tables (source tables) by merging indices on the source tables while enforcing restrictions on the rows of each source table that are eligible to be joined. A one-table row mapping structure represents one or more restrictions on the rows of a particular source table that are eligible for joining. The one-table row mapping structure contains indications of whether each row of the source table is eligible for joining, and may be used to "filter" its source table so that the source table only appears to contain the subset of its rows that is eligible for joining. The facility constructs a one-table row mapping structure to enforce a particular restriction on a source table by traversing an index on the column of the source table that is the subject of the restriction, called the restricted column. Each row of the index on the restricted column contains a restricted field value from the source table and a list of references to the rows of the source table having that restricted field value. For each row of the index on the restricted column, if the restricted field value satisfies the restriction, then the facility stores indications in the one-table row mapping structure that each row of the source table referred to by the references of that row of the index is eligible for joining, else the facility preferably stores indications in the one-table row mapping structure that each row of the source table referred to by the references of that row of the index is not eligible for joining. While other implementations are possible, one-table row mapping structures are preferably implemented as "bitmaps." A bitmap is a data structure that contains one flag, or bit, for each row in its table which indicates whether or not the row is eligible to be joined under the restriction. If a particular bit is set (equal to one), then the corresponding row is eligible to be joined. Inversely, if a particular bit is clear (equal to zero), then the corresponding row is not eligible to be joined. While the terms "one-table row mapping structure and "bitmap" are used interchangeably herein, it will be clear to those skilled in the art that an alternative implementation of one-table row mapping structures could be readily substituted for bitmaps. For example, the one-table row mapping structures discussed herein could each be implemented as a list of bookmarks from the associated source table. The facility preferably contains special methods for constructing the one-table row mapping structures described briefly above and for traversing and reading join result tables by accessing indices used for joining source tables filtered by one-table row mapping structures.

The facility further uses "two-table row mapping structures" to efficiently join an arbitrary number of source tables at a time while enforcing restrictions on the rows of each source table that are eligible to be joined. Instead of attempting to join each row of one of the many source tables to rows of all of the other source tables at once, the facility joins each adjacent pair of source tables separately. For each adjacent pair of source tables, the facility constructs a two-table row mapping structure. The two-table row mapping structure maps each row of one member of the pair of source tables, called the "mapped-from" source table, to one or more rows of the other member of the pair, called the "mapped-to" source table. The facility constructs a two-table row mapping structure by merging an index on the join column of the mapped-from table with an index on the join column of the mapped-to table. While other implementations are possible, two-table row mapping structures are preferably implemented as a combination of a bitmap and a list of bookmarks. The bitmap contains one bit for each row of the mapped-from table indicating whether that row has been joined to a row of the mapped-to table. If a particular bit is set (equal to one), then the corresponding row has been joined to a row of the mapped-to table. Inversely, if a particular bit is clear (equal to zero), then the corresponding row has not been joined to a row of the mapped-to table. The list of bookmarks contains a bookmark identifying a row of the mapped-to table for each set bit of the bitmap. The order of the bookmarks preferably coincides with the order of the set bits in the bitmap, e.g., the third bookmark in the list corresponds to the third set bit in the bitmap. While the terms two-table row mapping structures are described herein as a combination of a bitmap and a list of bookmarks, it will be clear to those skilled in the art that an alternative implementation of two-table row mapping structure could be readily substituted for the combination of a bitmap and a list of bookmarks. For example, the two-table row mapping structures described herein could each be implemented as a list of ordered pairs of bookmarks, each ordered pair of bookmarks comprising a bookmark referring to a row of the mapped-from table and a bookmark referring to a row of the mapped-to table. The facility preferably contains special methods for constructing the two-table row mapping structures and for traversing and reading join result tables for an arbitrary number of source tables by accessing a series of two-table row mapping structures. Because the facility preferably constructs the necessary two-table row mapping structures for such a "many-table join" by reading indices, without reading source table rows, the facility is able to process many-table joins very rapidly.

Figure 9:
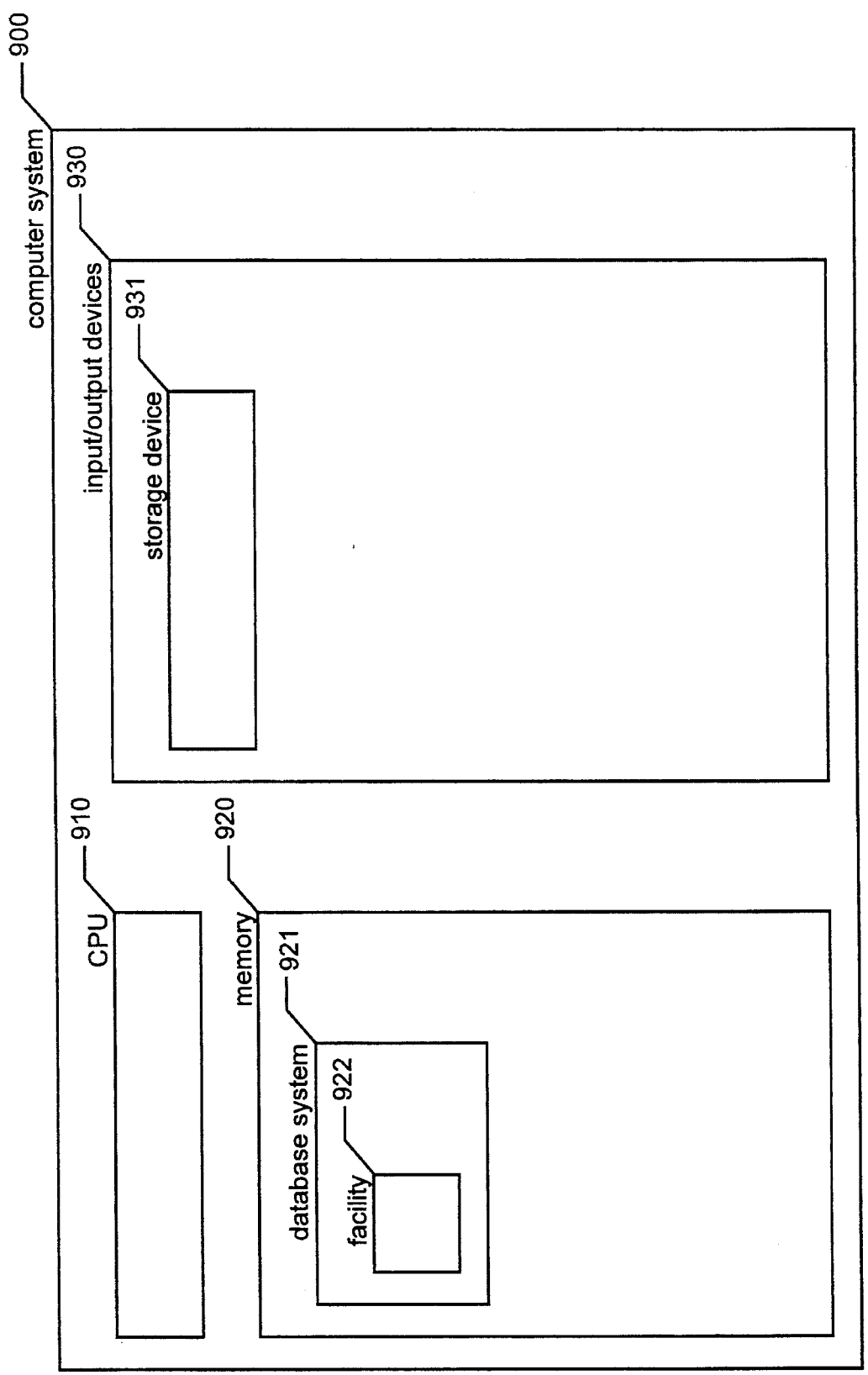
FIG. 9 is a high-level block diagram of the general-purpose computer system upon which the facility preferably operates

FIG. 9 is a high-level block diagram of the general-purpose computer system upon which the facility preferably operates. The computer system 900 contains a central processing unit (CPU) 910, a computer memory (memory) 920, and input/output devices 930. Among the input/output devices is a storage device 931, such as a hard disk drive. The memory contains software for a database system 921, which includes the facility 922.

Figure 10:
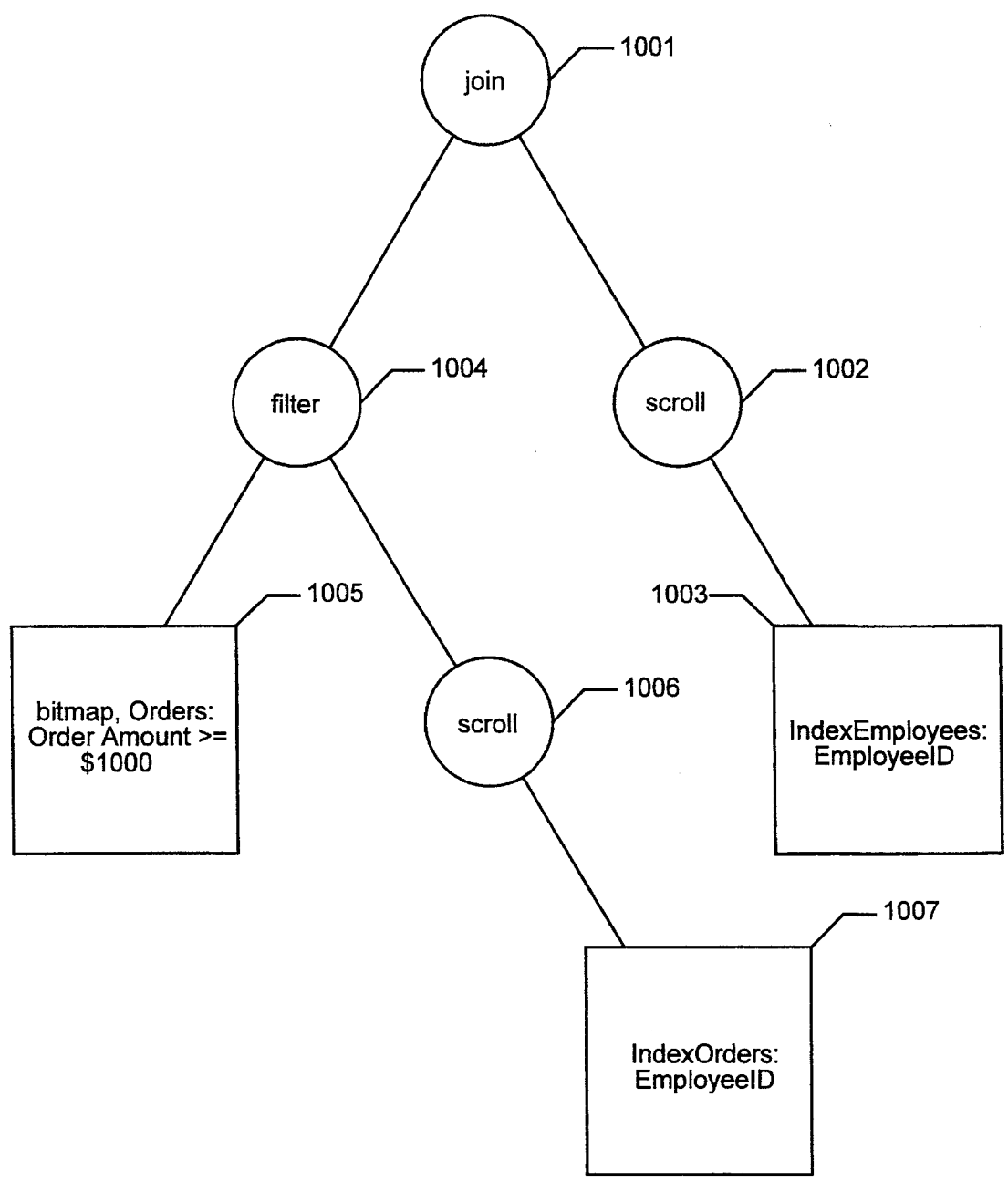
FIG. 10 is a database tree diagram showing a database tree representing the joining of two source tables subject to a restriction on a column of one of the source tables.

In order to join the Orders table shown in FIG. 2 with the Employees table shown in FIG. 1 using the EmployeeID field of each table, the facility preferably represents the join operation as a database tree. FIG. 10 is a database tree diagram showing a database tree representing the joining of two source tables subject to a restriction on a column of one of the source tables. The database tree contains nodes (shown as circles) and tables (shown as squares) that are connected by arcs. Each node corresponds to a function performed by the facility. The "root node" corresponds to a function that returns one row of the joined table for each invocation. The root node invokes functions of the other nodes (as indicated by the arcs) in order to perform its function. These other nodes may in turn invoke further nodes or access tables to perform their functions.

The database tree contains a join node 1001 that represents the actual matching of eligible rows of the source table.

The join node is connected to an index on the Employee ID column of the, Employees table (shown as "IndexEmployees:EmployeeID") 1003 via a scroll node 1002 that represents scrolling, or retrieving successive rows of, the index below it under the control of the join node above it. A corresponding scroll node 1006 and an index on the Employee ID column of the Orders table (shown as "IndexOrders:EmployeeID") 1007 are also connected to the join node, albeit via a filter node 1004. The filter node uses a bitmap 1005 to filter the index rows returned by scrolling the index on the Employee ID column of the Orders table 1007, so that only index rows for rows of the Orders table for which the Order Amount column contains a value greater than $1000 are passed up to the join node to be joined. Both indices preferably exist at the time the join operation is performed, having been maintained throughout the lives of the associated source tables. However, the bitmap 1005 is preferably generated specifically for the join operation.

Figure 11:
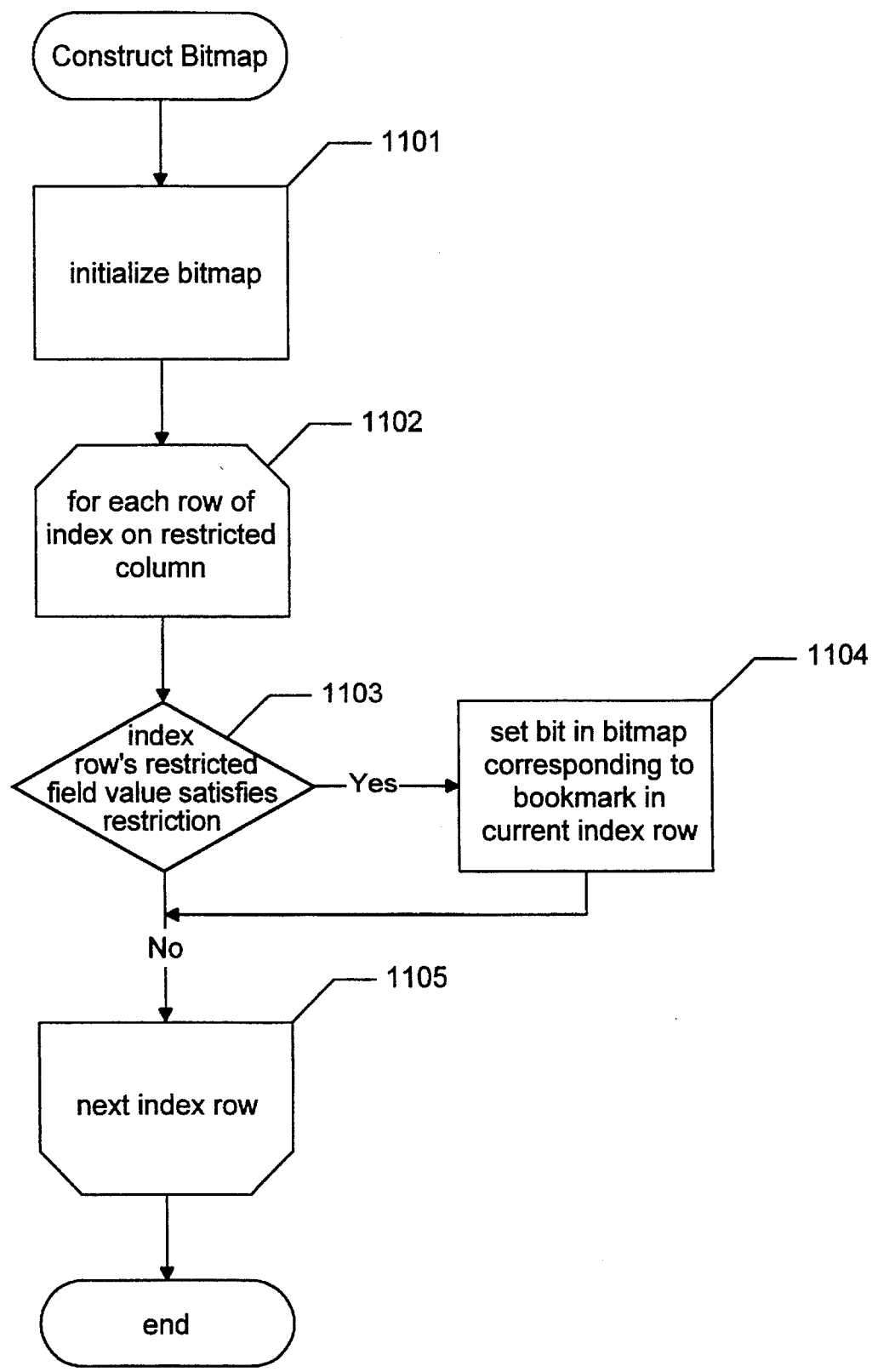
FIG. 11 is a flow diagram of a Construct Bitmap routine that generates a bitmap representing a restriction on a restricted column of a source table using an index maintained on the restricted column.

In order to perform the join operation, the facility generates bitmap 1005 shown in FIG. 10. FIG. 11 is a flow diagram of a Construct Bitmap function that generates a bitmap representing a restriction on a restricted column of a source table using an index maintained on restricted column. In step 110 1, the facility initializes the bitmap by clearing all of its bits. If necessary, the facility first allocates space in memory for the bitmap, that is, one bit for each row in the source table. In steps 1102–1105, the facility loops through each row of the index on the restricted column. Step 1102 marks the beginning of this loop, and step 1105 the end. (These "loop limit" symbols are discussed on page 6 of ANS/ISO 5807-1985, a standard for, among other things, symbols and conventions for program flowcharts promulgated by the International Standards Organization and adopted by the American National Standards Institute.) In step 103, if the restricted field value for the current row of the index satisfies the restriction, then the bookmark contained in the current row of the index refers to a row of the source table that satisfies the restriction, and the facility continues at step 1104 to mark this row as eligible for joining, else the facility continues at step 1105 to loop to the next row of the index. In step 1104, the facility sets the bit in the bitmap corresponding to bookmark contained in the current row of the index. The facility then continues at step 1105 to loop to the next row of the index. After the last row of the index has been considered, the function concludes.

In the following, the construction of the bitmap 1005 is described as an example of the operation of the steps shown in FIG. 11. FIG. 12 is an index diagram showing the contents of the index on the Order Amount Column of the Orders table. The index 1200 contains a row for each row of the Orders table. Each row of the index contains a value appearing in the Order Amount column of the Orders table. Each row also contains a bookmark referencing a row whose Order Amount field contains that value. For example, because the Order Amount "$3,194.20" appears in the same row of the index as a bookmark referencing row 5 of the Orders table, the Order Amount field of row 5 of the Orders table contains the value "$3,194.20". The Construct Bitmap function initializes a bitmap, then loops through the rows of an index on the Order Amount Column of the Orders table. For each rosy of the index, if the Order Amount value is at least "$1000", then the facility Sets the bit corresponding to each bookmark contained in that row of the index. For example, because "$3,194.20" is at least as large as "$1000", the bit corresponding to the bookmark "5" is set. However, because "$87.20" is not at least as large as "$1000", the bits corresponding to the bookmarks "7" and "20" are not set. It can be seen that, because indices are sorted on the index column, some restrictions are amenable to optimizations of the steps shown in FIG. 11. Specifically, in the case of the present restriction on the value of the Order Amount column, the facility could stop constructing the bitmap immediately after considering the row of the index containing the Order Amount "$731.80" and determining that it does not satisfies the restriction, as it is clear that none of the remaining rows or the index (which, because the index is sorted on Order amount, each have an Order Amount no larger than "$731.80") satisfy the restriction.

Figure 13:
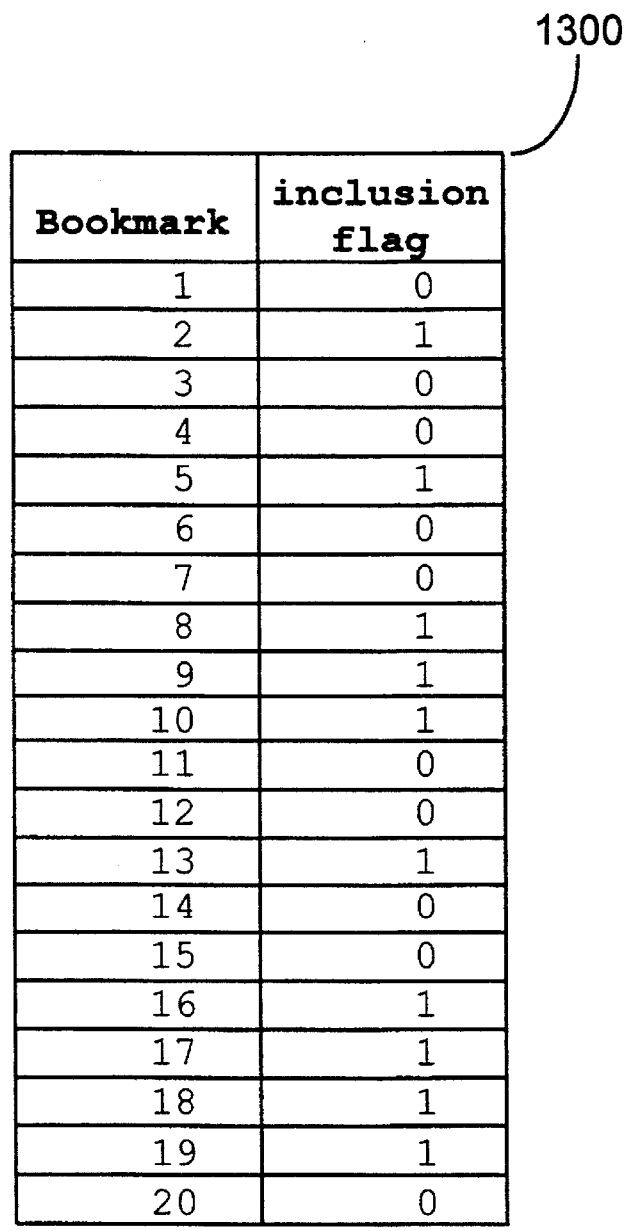
FIG. 13 is a bitmap diagram showing the contents of the bitmap constructed from the index shown in FIG. 12.

FIG. 13 is a bitmap diagram showing the contents of the bitmap constructed from the index shown in FIG. 12. The bitmap 1300 is comprised of twenty bits, each corresponding to one of the twenty rows of the Orders table shown in FIG. 2. The Bookmark column of FIG. 13 is not part of the bitmap, but only serves to illustrate the correspondence between bookmarks and bits in the bitmap. It can be seen that, consistent with the description above, the bit for bookmark "5", corresponding to row 5 of the Orders table, has been set by the facility, while the bits for bookmarks "7" and "20" corresponding to rows 7 and 20 of the Orders table, have not.

After the one-table row mapping source has been constructed, the facility may process the tree shown in FIG. 10 in order to perform the join represented by the join node. The database system first processes the join node. This involves executing a routine associated with each of its two children, i.e., a Scroll Index routine associated with the scroll node 1002 and a Filter Index routine associated with the filter node 1004. Each routine returns index rows for one of the source tables, which the join node attempts to merge. If the join field values from the index rows returned by the routines match, then the join node merges the row referred to by the bookmark returned in a row of the first index with the row referred to by the bookmark returned in a row of the second index, else the join node scrolls one of the indices again (preferably the index with the higher join field value) to return another index row in search of a matching join field value.

Figure 14:
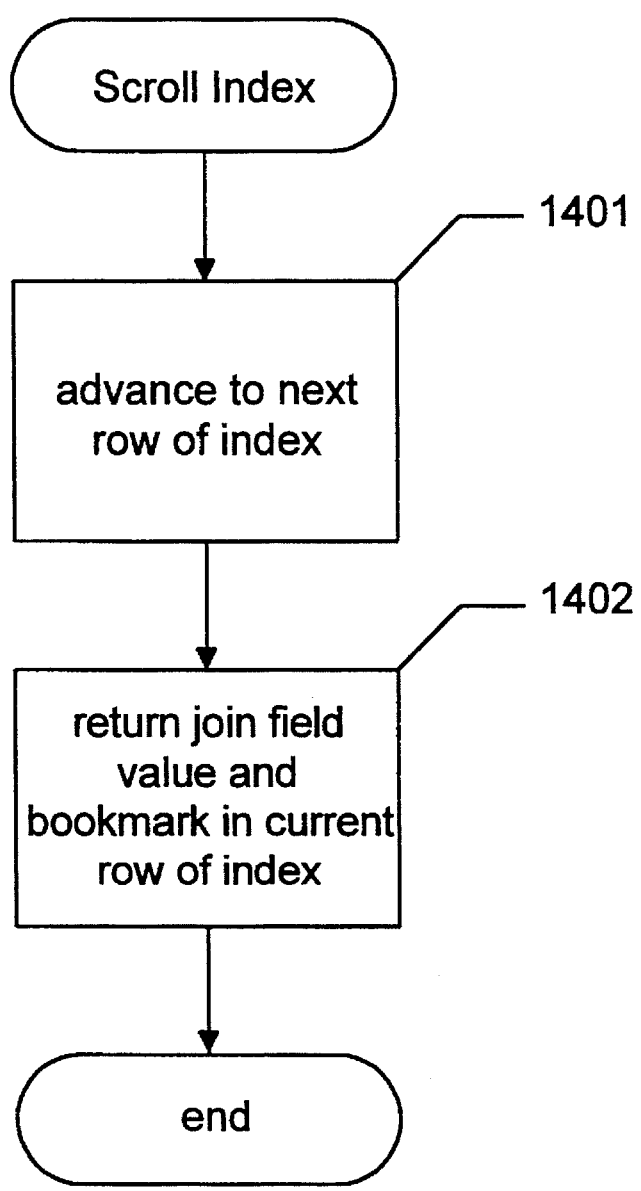
FIG. 14 is a flow diagram of a Scroll index routine that scrolls an index, such as the index on the Employees table shown in the tree of FIG. 10, advancing the current row of the index by one and returning the new current row.

FIG. 14 is a flow diagram of a Scroll Index routine that scrolls an index, such as the index on the Employees table shown in the tree of FIG. 10, advancing the current row of the index by one and returning the new current row. The scroll node maintains an indication of the current row in the index to be scrolled. In step 1401, the scroll node advances the current row of the index to be scrolled to the next row of the index. In step 1402, the scroll node returns the join field value for the new current row of the index, as well as the bookmark contained in the new current row of the index. The Scroll Index routine then concludes.

Figure 15:
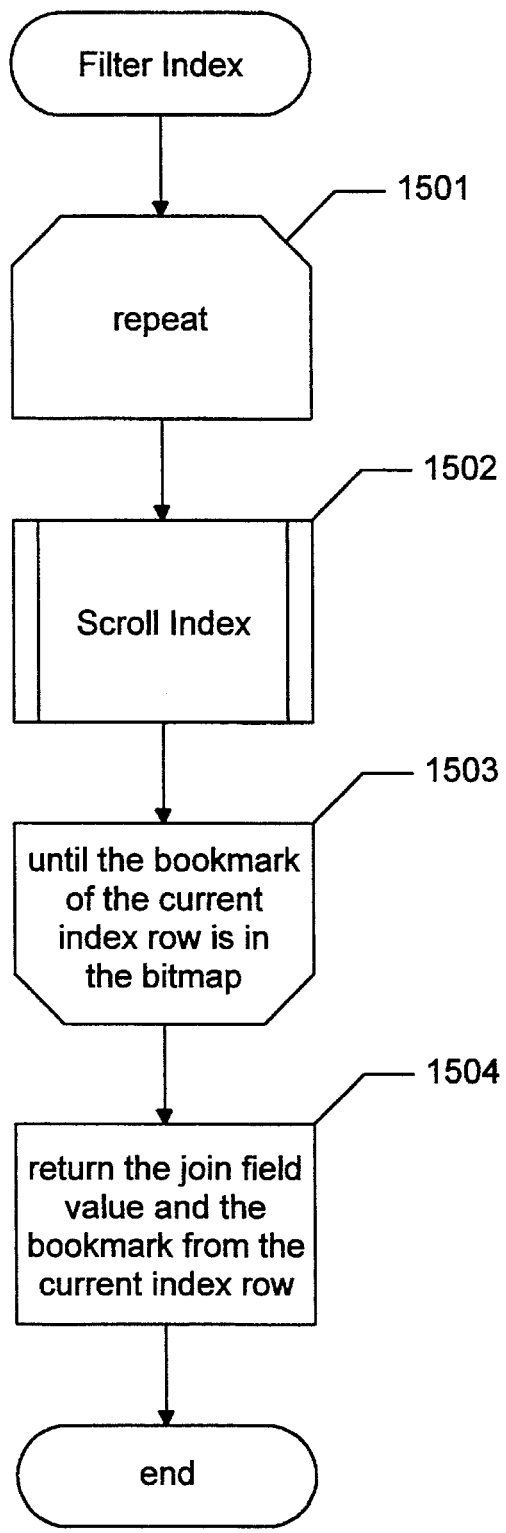
FIG. 15 is a flow diagram of a Filter Index routine that scrolls an index and returns only references to source table rows for which bits are set in a filtering bitmap.

FIG. 15 is a flow diagram of a Filter Index routine that scrolls an index and returns only references to source table rows for which bits are set in a filtering bitmap. In steps 1501–1503, the filter node advances through successive rows of the index until the current index row contains a bookmark whose corresponding bit of the bitmap is set. Then, in step 1504, the filter node returns the contents of the join field of the current row of the index, as well as the bookmark from the current row of the index. In this way, when the index merge functionality of the database system scrolls a source table index to retrieve information about rows of the source table to be joined and the source table index is governed by a restriction, only information for rows that satisfy the restriction are provided to the index merge functionality of the database system.

The above-described approach is effective for enforcing any number of restrictions, each on the contents of one or more columns of the same source table. For example, in the join operation described above, in addition to restricting the Order Amount column of the Orders table to values of at least $1000, the Region column of the Employees table may be restricted to values of "NW". This involves using an index on the Region column of the Employees table to construct a bitmap of the rows of the Employees table having "NW" in their Region field, then using the Filter Index routine to scroll the index filtered by the bitmap when merging the indices for the Orders and Employees tables. It can also be appreciated by one skilled in the art that multiple restrictions can easily be enforced against a single source table (e.g., for the Orders table, Order Amount>=$1000 and Order ID<10010) by constructing a bitmap for each of the restrictions, then applying the appropriate Boolean operation (e.g., AND) to the bits corresponding to the same source table row in each bitmap to produce a composite bitmap, which the Filter Index routine uses to filter the index on the restricted source table in the steps shown in FIG. 15.

A slightly different approach is preferably employed by the facility when a restriction that requires information from more than one source table to evaluate is imposed on a join operation. For example, if the Employees and Orders tables were joined with the restriction that either the Order Amount field of the Orders table is at least $1000 or the Region field of the Employees table is "NW", it is preferable to determine whether a particular row of either source table is eligible to be included in the result after the two source tables are joined. Such multi-table restrictions are enforced after the source tables to which they apply have been joined.

Figure 16:
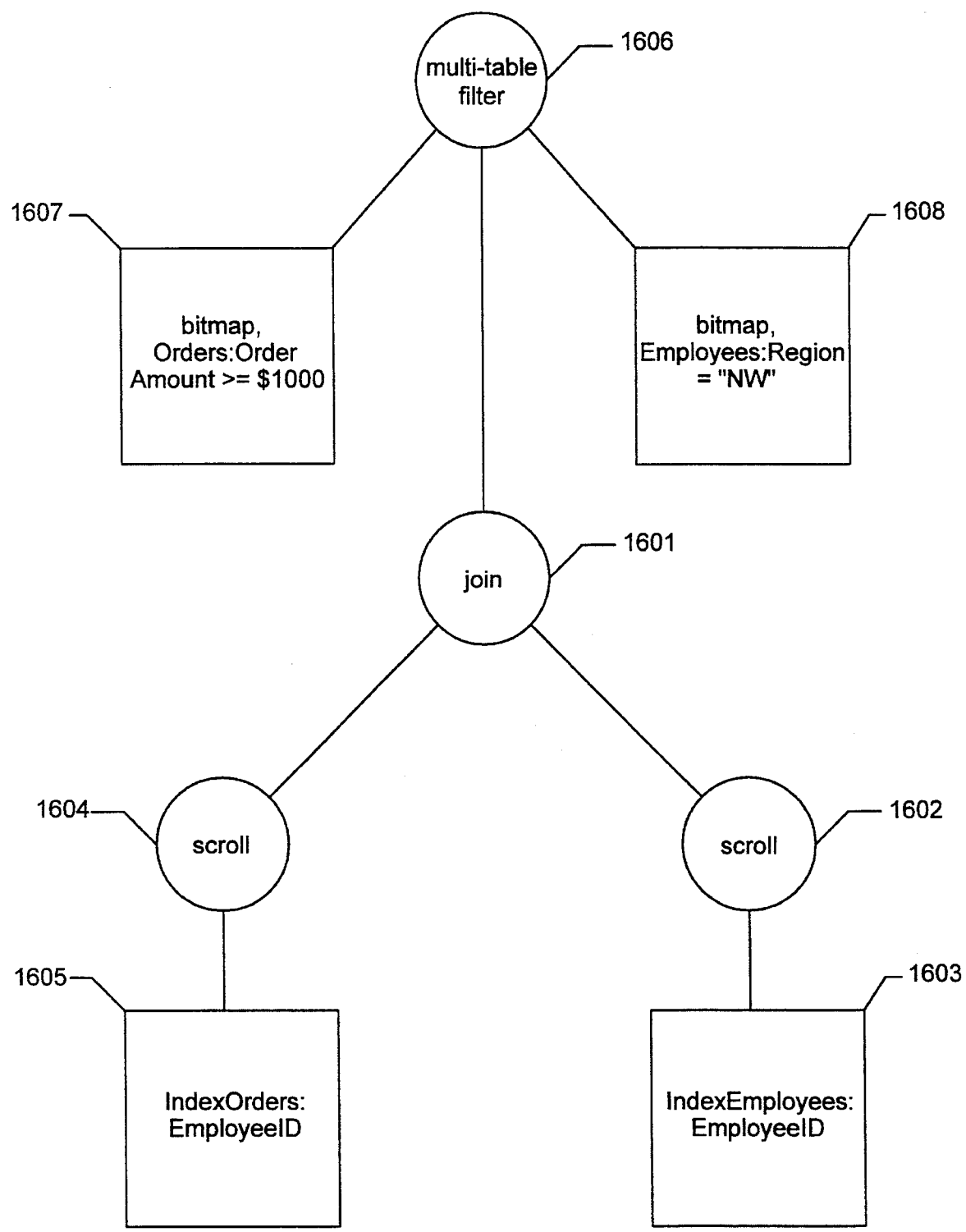
FIG. 16 is a database tree diagram of a database tree representing a join operation subject to a multi-table restriction.

FIG. 16 is a database tree diagram of a database tree representing a join operation subject to a multi-table restriction. The tree contains a join node 1601 representing the join operation. The join node is connected via scroll nodes 1602 and 1604 to indices on the join fields of the source tables: an index on the Employee ID column of the Orders table (shown as "IndexOrders:EmployeeID") 1603 and an index on the Employee ID column of the Employees table (shown as "IndexEmployees:EmployeeID") 1605. The database system uses the Scroll Index routines to scroll each of the indices and to merge all of the rows of each source table, producing the result table shown in FIG. 7. Again, each row of the result table contains a bookmark that refers to a matched row from each of the joined source tables. Above the join node in the tree is a special multi-table filter node 1606. The multi-table filter node has associated with it two bitmaps: an Order Amount bitmap 1607 for enforcing the Orders:OrderAmount>=$1000 part of the disjunctive multi-table restriction and a Region bitmap 1608 for enforcing the Employees:Region="NW" part of the disjunctive multi-table restriction. The facility executes the Construct Bitmap routine shown in FIG. 11 to construct each of these bitmaps uses an index on the restricted column of the appropriate source table with the steps.

Figure 17:
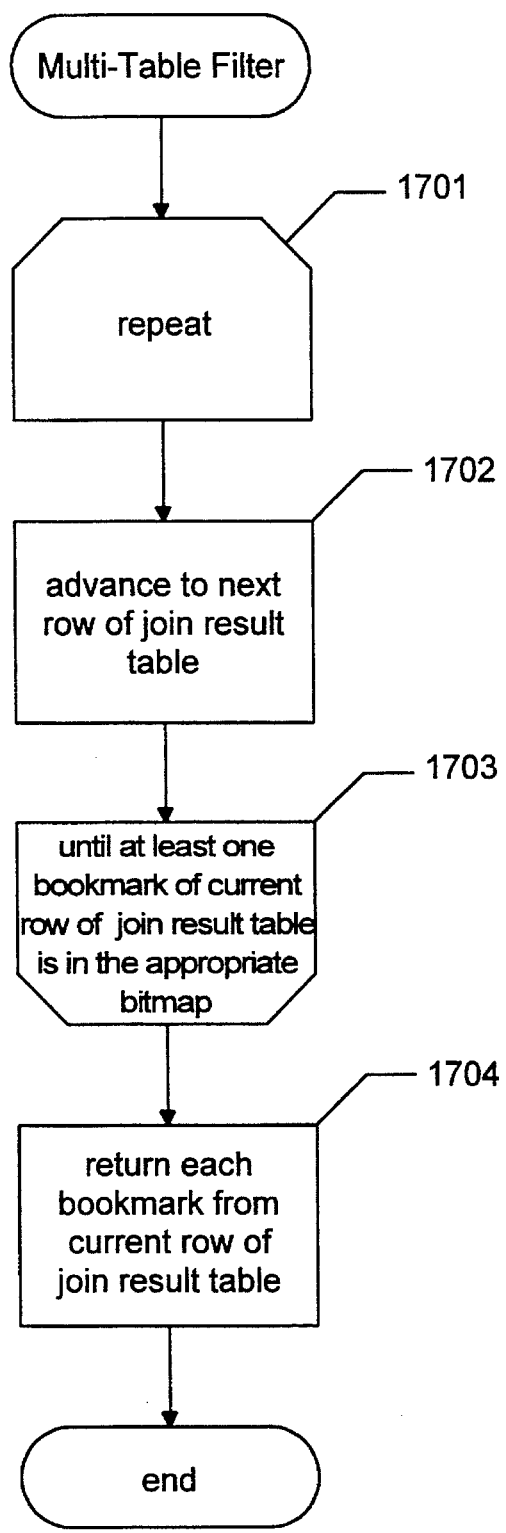
FIG. 17 is a flow diagram of a Multi-Table Filter routine that applies a multi-table restriction to the results of a join operation and retrieve a single row of the join result table that satisfies the multi-table restriction.

FIG. 17 is a flow diagram of a Multi-Table Filter routine that applies a multi-table restriction to the results of a join operation and retrieves a single row of the join result table that satisfies the multi-table restriction. This process may be repeated to retrieve all of the rows of the join result table that through successive rows of the join result table until, for at least one of the bookmarks from each of the joined source tables appearing in the join result table, the corresponding bit of the appropriate bitmap is set. When this condition is satisfied, the current row of the result table satisfies the multi-table restriction, and, in step 1704, the facility returns each bookmark from the current row of the join result table. These steps then conclude.

Figure 18:
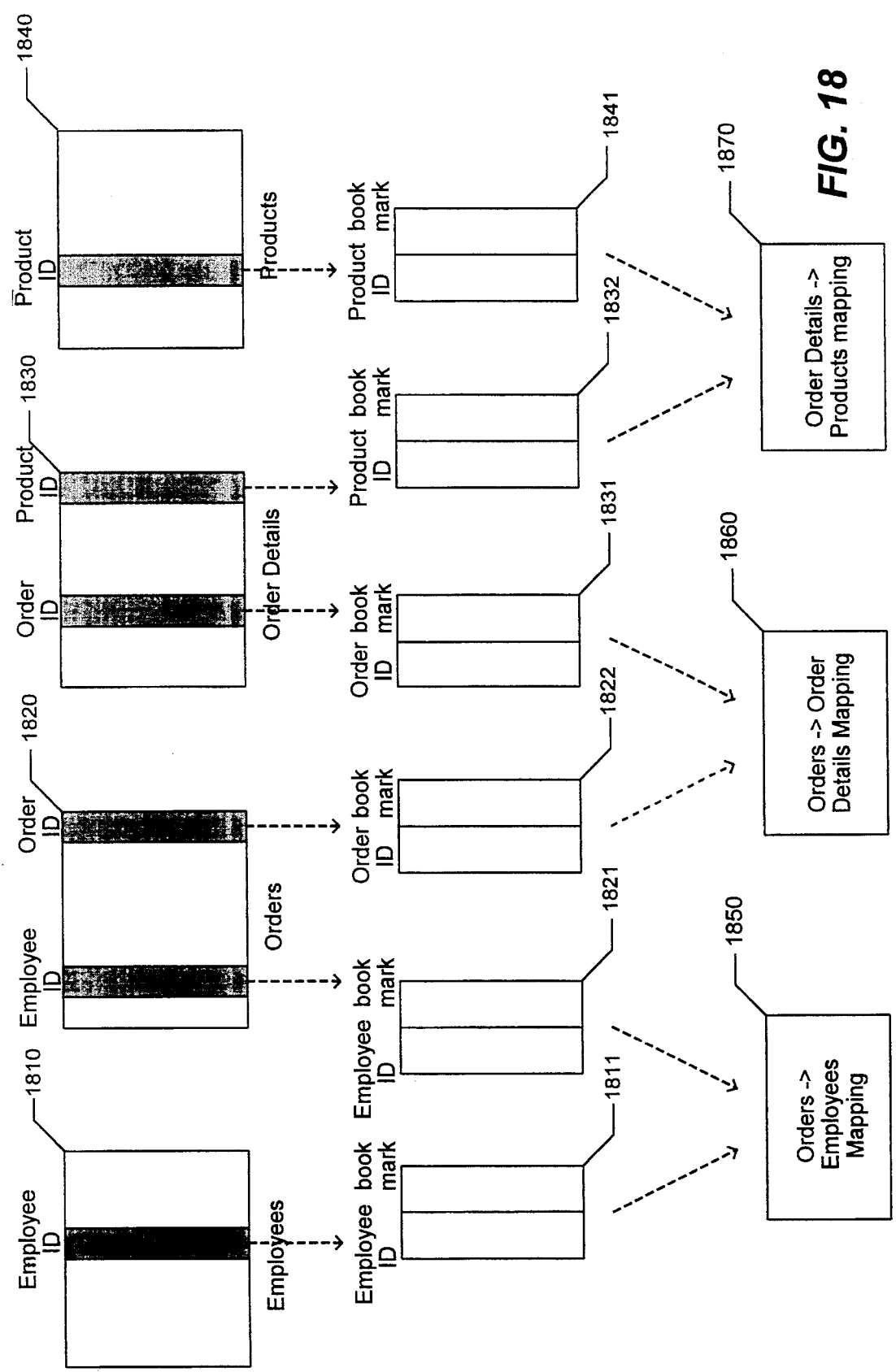
FIG. 18 is an overview diagram showing the genesis of two-table matching structures constructed by the facility for four-table join.

FIG. 18 is an overview diagram showing the genesis of two-table matching structures constructed by the facility for a four-table join. The diagram shows four source tables: the Employees table 1810, the Orders table 1820, the Order Details table 1830, and the Products table 1840. The Employees table is joined to the Orders table via an Employee ID column of each table. The Orders table is joined to the Order Details table by an order ID column of each table. The Order Details table is joined to the Products table by a Product ID column of each table. Indices are maintained on each of the join columns: an Employees:EmployeeID index 1811, an Orders:EmployeeID index 1821, and Orders:OrderID index 1822, and OrderDetails:OrderID index 1831, and OrderDetails:ProductID index 1832, and a Products:ProductID index 1841.

In order to join an arbitrary number of tables, the facility constructs a compact two-table row mapping structure for every adjacent pair of source tables. For each two-table row mapping structure, the facility first selects a mapping direction. Selecting a mapping direction involves designating one member of the pair of source tables a "mapped-from" table and the other member of the pair a "mapped-to" table. Once the source tables of a pair are so designated, the facility constructs the two-table row mapping structure to map from the rows of the mapped-from source table to the rows of the mapped-to source able. The mapping direction is preferably based on the selection of a "starting table." The starting table is the table containing the column that will be used to order the rows of the join result table, which is also the column that may be used to seek into the join result table. In the example, because the database system may attempt to seek into the Order ID column of the Orders table, the facility selects the Orders table as the starting table and causes the join result table to ordered on the Order ID column. The facility designates the starting table the mapped-from member of each pair which it is a member, and designates each table adjacent to the starting table as the mapped-to table of its pair with the starting table. The mapped-from table and mapped-to table of remaining pairs are then chosen such that, for each pair, the mapped-from table is nearer to (fewer joins away from) the starting table than is the mapped-to table. The two-table row mapping structure between the Employees table and the Orders table 1850 therefore maps from rows of the Orders table (the starting table) to rows of the Employees table. Further, the two-table row mapping structure between the Orders table and the Order Details table 1860 therefore maps from rows of the Orders table to rows of the Order Details table. Finally, the two-table row mapping structure between the Order Details table and the Products table 1870 therefore maps from rows of the Order Details table to rows of the Products table.

Figure 19:
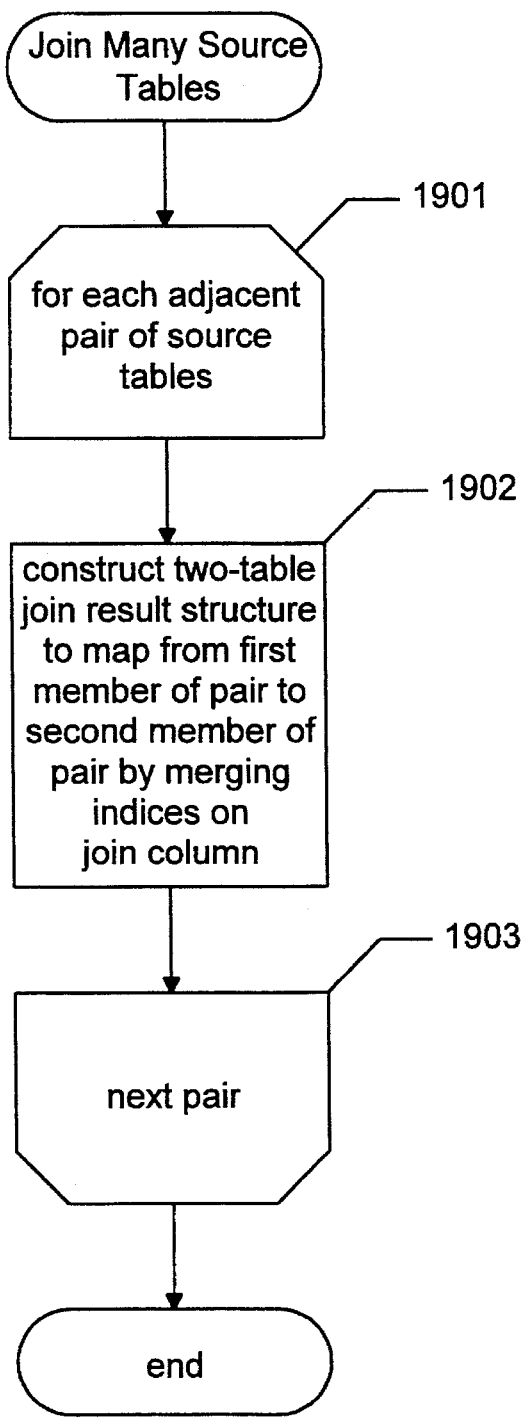
FIG. 19 is a flow diagram showing a Join Many Source Tables routine executed by the facility in order to join an Arbitrary Number of source tables.

FIG. 19 is a flow diagram showing a Join Many Source Tables routine executed by the facility in order to join an arbitrary number of source tables. In steps 1901–1903, the facility loops through each adjacent pair of source tables specified for the join operation, In Step 1902, for each adjacent pair of source tables specified for the join operation, the facility constructs a two-table row mapping structure by merging indices on the join column common to both source tables of the pair. Either or both of the source tables of the pair may preferably be filtered using bitmaps to enforce restrictions as described above. For each row of the mapped-from table that is joined to at least one row of the mapped-to table, the corresponding bit of the bitmap of the two-table row mapping structure is set. Further, a bookmark for the row of the mapped-to table to which the current row of the mapped-from table is joined is stored in the list of bookmarks. Because the facility preferably constructs the necessary two-table row mapping structures for such a "many-table join" by reading indices, without reading source table rows, the facility is able to process many-table joins very rapidly.

FIG. 20 is a diagram showing the two-table row mapping structure constructed for mapping from the Employees table to the Orders table. The diagram shows a bitmap 2000 containing twenty bits, one for each of the twenty rows of the Orders table. The diagram also shows a list of bookmarks 2050. The list contains ten bookmarks, one corresponding to each of the set bits, or ones, in the bitmap and indicating which row of the mapped-to table is joined to the row of the mapped from table indicated by that bit of the bitmap. For example, the value "0" of the bit having the bookmark "1" and corresponding to row 1 of the Orders table indicates that row 1 of the Orders, or mapped-from, table is not joined to any row of the Employees, or mapped-to, table. Further, the value "1" of the bit corresponding to row 2 of the Orders table indicates that row 2 of the Orders table is joined to a row of the Employees table. The value "8" of the first bookmark indicates that row 2 of the Orders table is joined to row 8 of the Employees table. The value of a bit of the bitmap is zero if either the corresponding mapped-from table row has been filtered out in accordance with a restriction or the corresponding mapped-from table row does not match any row of the mapped-to table. Alternate two-table mapping structures, such as a list of ordered pairs of bookmarks, may instead be constructed. In the example, such a structure would comprise ten ordered pairs of bookmarks. The mapped-to bookmark of each ordered pair would correspond to the bookmarks in the list of bookmarks 2050. The mapped-from bookmark of each ordered pair of bookmarks would be the bookmark corresponding to the position of each set bit of the bitmap 2000. For example, one of the ordered pairs would be (2, 8).

In some cases (not shown), a single row of a mapped-from table may be joined to more than one row of the corresponding mapped-to table. In such cases, instead of storing one bookmark corresponding to each set bit of the bitmap in a list of bookmarks in the two-table row mapping structure, the facility preferably stores a group of bookmarks corresponding to each set bit of the bitmap in a list of groups of bookmarks.

Figure 21:
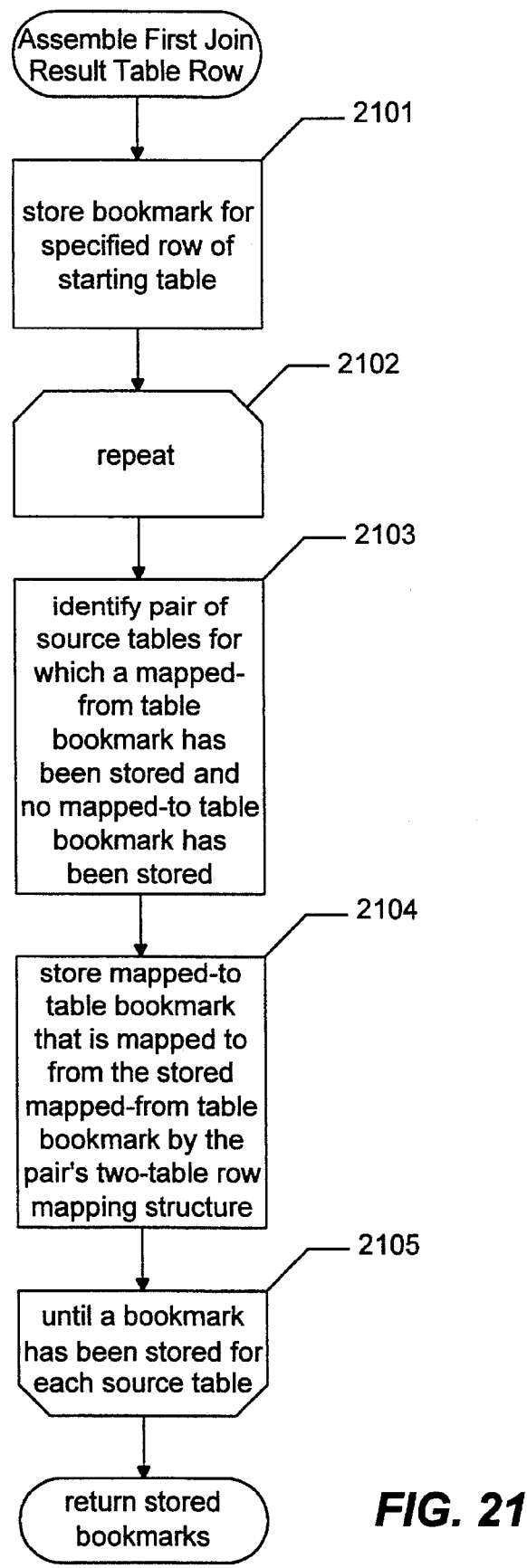
FIG. 21 is a flow diagram showing an Assemble Join Result Table Row routine, which is called to retrieve bookmarks for a row of the join result table.

FIG. 21 is a flow diagram showing an Assemble First Join Result Table Row routine, which is called to retrieve bookmarks for the first row of the join result table. The routine begins at the first row of the starting table. The facility retrieves a bookmark for the first row of the starting table from an index on the starting table. In step 2101, the routine stores the bookmark for the first row of the starting table. When the routine has stored a bookmark for each of the source tables, it will return the stored bookmarks. In steps 2102 through 2105, the routine identifies and stores bookmarks for the rows of the other source tables that are joined to the first row of the starting table. Step 2102 marks the beginning of a loop that is repeated until the routine has stored a bookmark corresponding to a row of each source table that is joined to the first row of the starting table. Step 2105 marks the end of this loop. In step 2103, the routine identifies an adjacent pair of source tables where the routine has already stored a bookmark corresponding to a row of the mapped-from table but has not stored a bookmark corresponding to a row of the mapped-to table. In step 2104, the routine stores a bookmark corresponding to a row of the mapped-to table that is joined, directly or indirectly, to the first row of the starting table. The routine obtains the bookmark by using the two-row mapping structure for the identified adjacent pair to map from the already stored bookmark for the mapped-from table to a bookmark corresponding to the row of the mapped-to table to which that row of the mapped-from table is joined. To discern the mapping, the routine checks the bit of the bitmap corresponding to the stored mapped-from table bookmark. If the bit is clear "0"), the row of the mapped-from table is joined to no rows of the mapped-to table. In this case, the join of the current row of the starting table is preferably aborted, as it is joined to no rows of the mapped-to table of the current pair. If so, the facility advances to the next row of the index on the starting table. If, on the other hand, the bit is set "1"), the row of the mapped-from table is joined to at least one row of the mapped-to table. In this case, the routine counts the number of set bits in the bitmap up to and including the bit corresponding to the row of the mapped-from table. This count specifies in the list of groups of bookmarks a group of bookmarks referring to the rows of the mapped-to table that are joined to the row of the mapped-from table. The routine stores the first bookmark of the group of bookmarks referring to the rows of the mapped-to table that are joined to the row of the mapped-from table. In step 2105, if a bookmark has been stored for each source table, then the routine returns the stored bookmarks and ends, else the routine continues at step 2103 to store a bookmark for another source table. The steps shown in the Assemble First Join Result Table Row routine may also be used to return a row of the Join Result table containing any row of the starting table. This requires only substituting the identity of the specified row for the first row in these steps.

Figure 22:
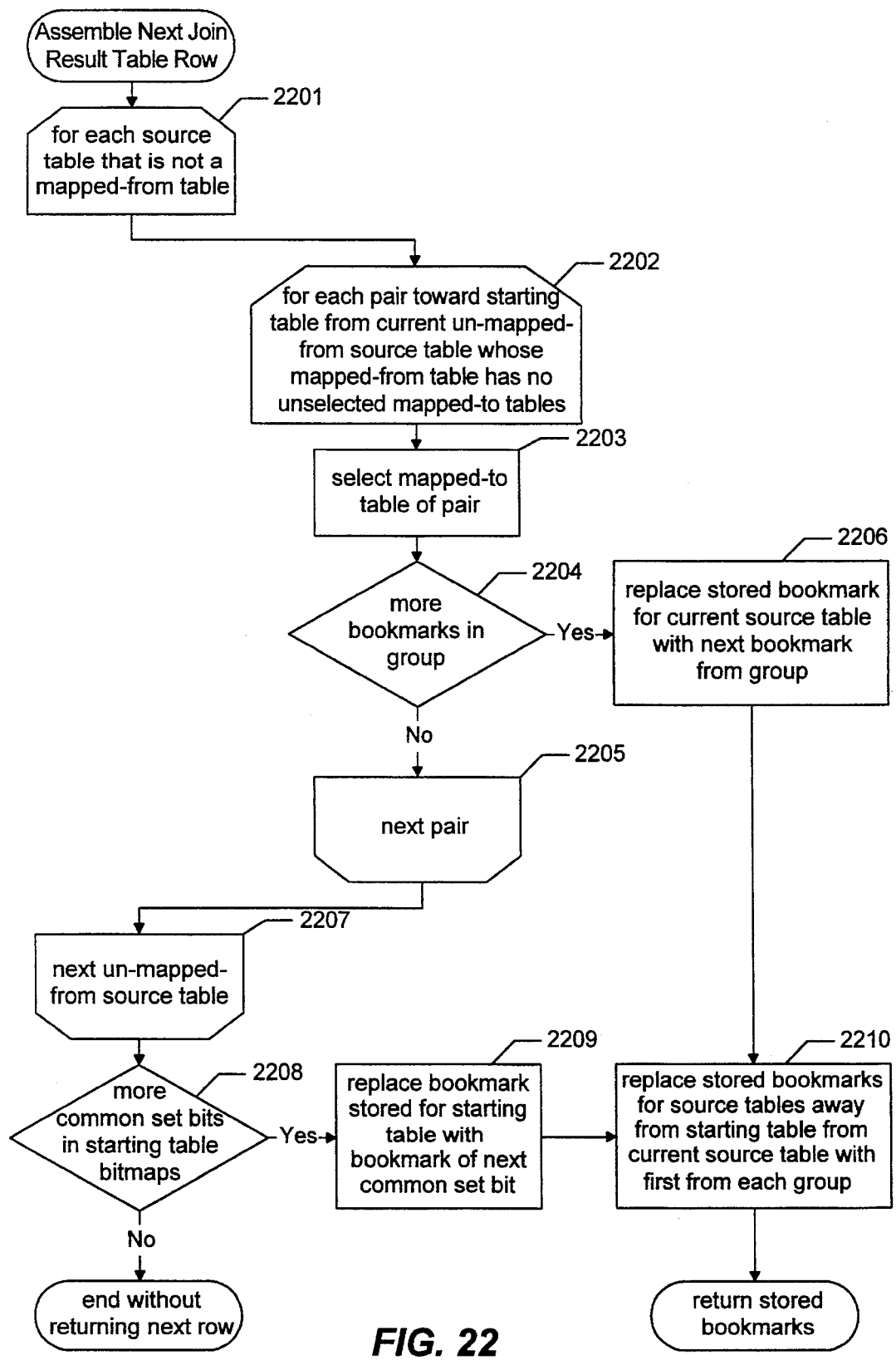
FIG. 22 is a flow diagram showing an Assemble Next Join Result Table Row routine, which is called after the Assemble First Join Result Table Row routine to retrieve bookmarks for the next row of the join result table.

FIG. 22 is a flow diagram showing and Assemble Next Join Result Table Row routine, which is called after the Assemble First Join Result Table Row routine to retrieve bookmarks for the next row of the join result table. In an earlier call to either the Assemble Next Join Result Table Row routine or the Assemble First Join Result Table Row routine, the facility stored the bookmarks corresponding to the source table rows that make up the current row of the join result table. The Assemble Next Join Result Table Row routine modifies the stored bookmarks in order to return the bookmark for the next row of the join result table. Because a row of a pair's mapped-from table can be mapped by the pair's two-table row mapping structure to more than one row of the mapped-to table, each row of the join result table does not necessarily contain a different row of the starting table. In such cases, the routine can therefore not merely advance to the next set bit in the bitmaps for the pairs in which the starting table is the mapped-from table. Rather, the routine must first attempt, for each other source table, to replace its bookmark with the next bookmark in the current group of the appropriate two-table row mapping structure, if any bookmarks remain in the current group. The routine essentially traverses the two-table row mapping structures in postorder (from the most distant source tables toward the starting table), looking for a two-table row mapping structure in which the current mapped-to bookmark group has remaining bookmarks. If the routine finds one, it replaces the stored bookmark for the mapped-to table with one of the remaining bookmarks, else it replaces the bookmark for the starting table with one corresponding to a bit set in each of the bitmaps for the starting table. In either case, the routine continues by, for each source table in the direction away from the starting table from the source table whose stored bookmark was replaced, replacing the stored bookmark with the first one in the mapped-to bookmark group.

In step 2201–2207, the Assemble Next Join Result Table Row routine loops through the source tables that are not the mapped-from table of any pair ("un-mapped-from tables"). Step 2201 marks the beginning of this loop, and step 2207 the end. In steps 2202–2205, for each un-mapped-from table, the routine loops through the source table pairs from the pair containing the current un-mapped-from table toward the starting table, stopping when in reaches a pair in which the mapped-from table is also the mapped-from table of another pair in which the mapped-to table has not yet been selected. Step 2202 marks the beginning of this loop, and step 2205 the end. In step 2203, the routine selects the mapped-to table of the pair. In step 2204, if there is another bookmark after the bookmark currently stored for the selected source table in the bookmark group that is the current entry in the list of bookmark groups in the two-table row mapping structure for the current pair, then the routine continues at step 2206, else the routine continues at step 2205 to loop to the next pair toward the starting table. In step 2206, the routine replaces the bookmark currently stored for the selected source table with the bookmark that follows it in the bookmark group that is the current entry in the list of bookmark groups in the two-table row mapping structure for the current pair. The routine then proceeds to step 22 10 (discussed further below) to propagate the change of the current row of the selected source table to the source tables to which the selected source table maps, directly or indirectly.

If the routine loops through all of the source table pairs from the pair containing the current un-mapped-from table toward the starting table which the mapped-from table is not also the mapped-from table of another pair in which the mapped-to table has not yet been selected without finding a bookmark group with remaining bookmarks, then the routine continues at step 2207 to loop to the next un-mapped-from source table. If the routine loops through all of the un-mapped-from source tables Without finding a bookmark group with remaining bookmarks, then the routine continues at step 2208. In step 2208, if the bitmaps corresponding to the starting table (i.e., the bitmaps of the two-table row mapping structures for source table pairs of which the starting table is a member) each have a common bit set after the set bit corresponding to the bookmark currently stored for the starting table, then the routine continues at step 2209, else the routine ends without returning a next row of the join result table. In step 2209, the routine replaces the bookmark currently stored for the starting table with the bookmark corresponding to the next common set bit in the bitmaps. In step 2210, the routine propagate the change of the current row of the selected source table to the source tables to which the selected source table maps, directly or indirectly. This involves performing the steps shown as steps 2103–2105 in FIG. 21, i.e., using the two-table row mapping structures for the pairs of which the selected table (if step 2210 was reached from step 2206, or the starting table if step 2210 was reached from step 2209) is the mapped-from table to map from the new current bookmark of the selected table to the first bookmark in each corresponding group of mapped-to bookmarks. The bookmarks stored for these mapped-to tables are replaced with the new mapped-to bookmarks, and the process is repeated for any source tables to which the selected table is indirectly mapped. The routine then returns the set of stored bookmarks, as replaced.

As described herein, embodiments of the invention are able to join database tables more efficiently than existing methods because they read and merge compact, access-optimized indices instead of full source tables while retaining the ability to apply restrictions at every level of the join operation. The many-table join aspect of the facility has the further advantage that it divides the task of joining many tables into discrete subtasks, each of joining a pair of tables, making it well adapted to solution by parallel processing techniques. While this invention has been shown and described with reference to preferred embodiments, it will be understood by those skilled in the art that various changes or modifications in form and detail may be made without departing from the scope of the invention.

We claim:

1. A method in a computer database system for joining matching rows of an arbitrary number of source tables, each of the source tables being comprised of rows and being adjacent to at least one other source table, each particular one of the source tables having a join column that corresponds to a join column of each of the at least one other source table to which the particular one of the source tables is adjacent, each of the source tables having an index for each of its join columns, the method comprising the steps of:

for each of one or more pairs of adjacent source tables, constructing a two-table row mapping structure that maps from each of a plurality of joined selected rows of one source table of the pair to a matching row of the other source table of the pair by accessing the indexes of the join columns and without accessing the source tables;

receiving a request to return references to the source table rows comprising a row of the join;

in response to receiving the request, selecting a starting source table;

selecting a row of the starting source table;

selecting one row in each of the source tables besides the starting source table that matches any other selected source table row using the two-table row mapping structure; and returning references to the selected source table rows.

2. The method of claim 1 wherein the constructing step includes the steps of:

selecting one of the source tables of the pair as the mapped-from table of the pair and the other of the source tables of the pair as the mapped-to table; and for each row of the mapped-from table, identifying a row of the mapped-to table that matches the row of the mapped-from table, and storing an indication in the two-table row mapping structure that the row of the mapped-from table matches the identified row of the mapped-to table.

3. The method of claim 2, further including the step of, for each first source table from which no row has been selected that is adjacent to a second source table from which a row has been selected, selecting a the row of the first source table that is mapped to from the selected row of the second source table by the two-table row mapping structure for the pair of source tables.

4. A method in a computer system for joining a plurality of database source tables to produce a joined table, each table being comprised of rows, each source table being adjacent to at least one other source table, the method comprising the steps of:

for each of one or more adjacent pairs of source tables, generating a mapping structure for mapping from rows of a first source table of the pair to rows of the other source table of the pair to which the rows of the first source table are joined by using indexes of the source tables of the pair of source tables and without accessing the source tables; and generating the content of a row of the joined table by:
    selecting a row of a starting source table, and
    using the generated mapping structures to select a row of each source table besides the starting source table that is joined to the selected row of the starting source table.

5. The method of claim 4 wherein each source table contains a join column having a value for each row of the source table for each adjacent pair of source tables of which it is a member, and wherein the step of generating a mapping structure includes the steps of:
    maintaining an index on each of the two source tables of the pair that maps from values of the join column of the source table to rows of the source table having that value; and
    merging the indices to join the rows of the first source table having each join column value to rows of the second source table having that join column value.

6. The method of claim 4 wherein the step of using the generated mapping structures to select a row of each source table besides the starting source table includes the step of, for each source table besides the starting source table, selecting the first row of the source table that is mapped to by a selected row of another source table.

7. The method of claim 4 wherein a row of each source table has already been selected, and wherein the step of using the generated mapping structures to select a row of each source table besides the starting source table includes the steps of:
    identifying a pair of source tables in which the selected row of the first source table is mapped by the mapping structure to more than one row of the second source table;
    unselecting the selected row of the second source table of the identified pairs; and
    selecting a different row of the second source table of the identified pair that is mapped to from the selected row of the first source table of the identified pair by the mapping structure.

8. A method in a computer system for joining a first, a second, and a third source table, each source table having rows and columns, the first source table being indexed on a first join column, the second source table being indexed on both a first join column and a second join column, the third source table being indexed on a on a second join column, the method comprising:
    receiving a request to join the first source table to the second source table using the first join columns and to join the second source table to the third source table using the second join columns;
    generating a first join of the first and second source tables by creating a first mapping structure for mapping rows of the first source table to rows of the second source table based on the first join indexes and without accessing the first and second source tables;
    generating a second join of the second and third source tables by creating a second mapping structure for mapping rows of the second source table to rows of the third source table based on the second join indexes and without accessing the second and third source tables wherein the first an second joins are the result of the join.

9. A method in a computer system for joining a plurality of source tables, each source table having rows and columns, the source tables being logically ordered from a first to a last, each source table having a join column for each immediately adjacent source table, each source table having an index for each join column, the method comprising:
    receiving a request to join the source tables on their join columns;
    for each pair of immediately adjacent source tables, generating a pairwise join result by using the indexes for the join columns of the immediately adjacent source tables without accessing the immediately adjacent source tables to generate a mapping structure indicating which rows of the immediately adjacent source tables have matching values in their join column whereby the generated pairwise join results indicate the joined rows.

10. A computer-readable medium containing instructions for causing a computer system to join matching rows of an arbitrary number of source tables, each of the source tables being comprised of rows and being adjacent to at least one other source table, each particular one of the source tables having a join column that corresponds to a join column of each of the at least one other source table to which the particular one of the source tables is adjacent, each of the source tables having an index for each of its join columns, by:
    for each of one or more pairs of adjacent source tables, constructing a two-table row mapping structure that maps from each of a plurality of joined selected rows of one source table of the pair to a matching row of the other source table of the pair by accessing the indexes of the join columns and without accessing the source tables;
    receiving a request to return references to the source table rows comprising a row of the join;
    in response to receiving the request, selecting a starting source table;
    selecting a row of the starting source table;
    selecting one row in each of the source tables besides the starting source table that matches any other selected source table row using the two-table row mapping structure; and
    returning references to the selected source table rows.

11. The computer-readable medium of claim 10 wherein the constructing includes:
    selecting one of the source tables of the pair as the mapped-to table of the pair and the other of the source tables of the pair as the mapped-from table; and
    for each row of the mapped-from table,
    identifying a row of the mapped-to table that matches the row of the mapped-from table, and
    storing an indication in the two-table row mapping structure that the row of the mapped-from table matches the identified row of the mapped-to table.

12. The computer-readable medium of claim 11, further including, for each first source table from which no row has been selected that is adjacent to a second source table from which a row has been selected, selecting a the row of the first source table that is mapped to from the selected row of the second source table by the two-table row mapping structure for the pair of source tables.

* * * * *